(12) United States Patent
Lowe

(10) Patent No.: US 6,433,849 B1
(45) Date of Patent: Aug. 13, 2002

(54) HIGH REFLECTIVITY BISTABLE LIQUID CRYSTAL DISPLAY

(75) Inventor: Anthony Cyril Lowe, Braishfield (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,360

(22) Filed: Jan. 12, 2000

(30) Foreign Application Priority Data

Jan. 23, 1999 (GB) .............................................. 9901456

(51) Int. Cl.[7] .............................................. G02F 1/1337
(52) U.S. Cl. ........................ 349/123; 349/128; 349/129
(58) Field of Search ............................. 349/123, 74, 75

(56) References Cited

U.S. PATENT DOCUMENTS

| | | | |
|---|---|---|---|
| 5,796,459 A | | 8/1998 | Bryan-Brown et al. |
| 5,801,796 A | | 9/1998 | Lowe |
| 5,990,991 A | * | 11/1999 | Tillin et al. ................... 349/78 |
| 6,122,024 A | * | 9/2000 | Molsen et al. ................. 349/88 |
| 6,144,433 A | * | 11/2000 | Tillin et al. .................. 349/123 |
| 6,249,332 B1 | * | 6/2001 | Bryan-Brown et al. ..... 349/129 |

FOREIGN PATENT DOCUMENTS

WO    WO 97/14990    4/1997    .........  G02F/1/1337

* cited by examiner

*Primary Examiner*—Kenneth Parker
*Assistant Examiner*—David Chung
(74) *Attorney, Agent, or Firm*—Marian Underweiser; Anne Vachon Dougherty

(57) ABSTRACT

A bistable liquid crystal display cell comprises at least two compartments separated by thin transparent membranes. A first compartment contains a first liquid crystal mixture between a first substrate and a thin transparent membrane. A second compartment contains a second liquid crystal mixture between a second substrate and a thin transparent membrane. The mixtures have a first alignment in which they are both aligned parallel to the plane of the display cell, but orthogonal to each other, and a second alignment in which they are both aligned normal to the plane of the display cell. Each compartment has a grating located on a surface of the compartment.

16 Claims, 5 Drawing Sheets

HIGH REFLECTIVITY BISTABLE LIQUID CRYSTAL DISPLAY

FIELD OF THE INVENTION

The present invention relates to a bistable, reflective, liquid crystal display cell, having two, the compartments being separated from each other by a thin membrane, the cell being suitable for use in flat panel displays.

BACKGROUND OF THE INVENTION

Conventional single cell bistable reflective display technologies are limited to a maximum reflectivity of 35% over a limited wavelength range. U.S. Pat. No. 5,384,067 and U.S. Pat. No. 5,437,811 disclose examples of such bistable reflective displays. The maximum reflectivity is further limited to 25 to 30% if the display is required to operate over a wide enough wavelength range to be white. Additionally, such displays require very high switching voltages of around 80 volts. U.S. Pat. No. 5,453,863 discloses such a white reflective display.

The contrast and/or reflection performance of displays can be improved by using a stacked structure of two or more cells. These are formed by stacking separate cells, or by making more complex cells in which an intermediate substrate is shared by both cells, forming the rear surface of the front cell and the front surface of the rear cell.

Published German Patent application No. 19711827.5, corresponding to U.S. Pat. No. 5,801,796 discloses a cell construction which enables stacked cells to be formed in which the intermediate substrate is so thin that little or no parallax occurs between the images formed in the two or more cells. In addition, the thickness of the intermediate substrate is such that the field drop across it is sufficiently low (about 25%) compared to that across the liquid crystal layers, that the stacked cell can be addressed as a single cell. This greatly simplifies and reduces the cost of the interconnections and drive electronics. The ability, with two or more cells, to absorb essentially all polarisation states of incident light and the avoidance of the need for transparent electrodes on both surfaces of the intermediate substrate also improves transmittance (and reflectivity) of the device to greater than 60%.

GB Patent application no. 9802287.4 discloses a display cell that uses two or more compartments separated by dielectric membranes. The electro-optic characteristics of the mixture in the two compartments differs in that the mixture in one of the compartments switches at a low voltage, being switched completely below the switching threshold of material in the other of the compartments. This results in contrast ratios similar to that available from cells which use polarisers, as well as levels of reflectivity similar to that available from cells that do not use polarisers, that is, as high as 80%.

Ultra-portable products increasingly require displays with almost zero power consumption, but with high pixel density, contrast and reflectivity. Such displays also have to be the minimum cost that is possible. The displays referenced above, disclosed in German patent application no. 19711827.5 and GB Patent application no. 9802287.4 both achieve high pixel density, contrast and reflectivity, but do not achieve low power and cost since they need to be continuously refreshed and require an active matrix.

So it would be desirable to provide a reflective display which has zero power consumption when the image is not being changed. This may be achieved by the use of a bistable display. It would also be desirable to provide a reflective display having a higher reflectivity than conventional displays. It would further be desirable to provide a display which is lower cost than a conventional display. Such a reduction in cost may be achieved by a display which does not require an active matrix.

DISCLOSURE OF THE INVENTION

Accordingly the invention provides a bistable liquid crystal display cell comprising two compartments separated by a thin transparent membrane, the first compartment containing a first liquid crystal mixture between a first substrate and a thin transparent membrane and the second compartment containing a second liquid crystal mixture between a second substrate and the thin transparent membrane, the mixtures having a first alignment in which they are both aligned parallel to the plane of the display cell, but orthogonal to each other, and a second alignment in which they are both aligned normal to the plane of the display cell, each compartment having a grating located on a surface of the compartment.

The perpendicular alignment of the first and second liquid crystal mixtures means that a minimum of incident light is absorbed by the mixtures, which results in a higher reflectivity than conventional displays.

The grating associated with the first compartment may be located on the first substrate. Alternatively, the grating associated with the first compartment may be located on a surface of the thin transparent membrane forming the first compartment.

The grating associated with the second compartment may be located on a surface of the thin transparent membrane forming the second compartment. Alternatively, the grating associated with the second compartment may be located on the second substrate.

Preferably, the liquid crystal has positive dielectric anisotropy.

More preferably, the alignment on the grating and the plane surfaces of the cell is homeotropic and the liquid crystal layer has an untwisted structure in the continuous state.

Alternatively, the alignment on the grating surface of the cell is homeotropic, the alignment on the plane surface is homogeneous and the liquid crystal layer has a twisted structure in the continuous state.

In an embodiment the membrane separating the compartments of the cell is made from an organic polymeric dielectric material.

In another embodiment, the membrane separating the compartments of the cell is made from an inorganic dielectric material.

The perpendicular alignment of the first and second liquid crystal mixtures means that a minimum of incident light is absorbed by the mixtures, which results in a higher reflectivity than conventional displays.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
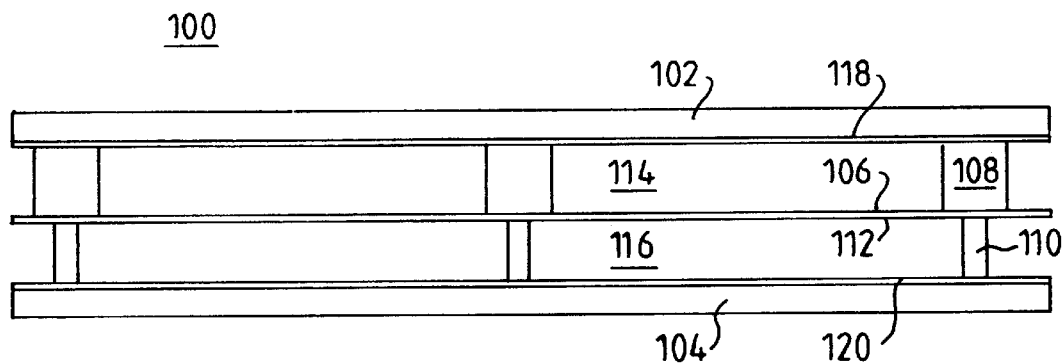
FIG. 1 shows a cross-section of a conventional two compartment display cell.

FIG. 1 shows a cross-section of a reflective cell 100 comprising a transparent front substrate 102 and a reflective rear substrate 104. A thin dielectric membrane having surfaces 106, 112 is supported between substrates 102 and 104 by means of precisely located spacers 108, 110. Two compartments 114, 116 are formed, which are filled with liquid crystal material. Substrate 102 is coated with a transparent electrically conducting material 118 such as indium-tin oxide (ITO) on its inner surface. Substrate 104 is coated either with a reflective electrically conducting material or with a transparent conductive material 120 coated on to a reflective insulating material on its inner surface. The conductor material 120 is etched into a multiplicity of electrodes, one for each pixel, as is known in the art. The conductor material 118 forms a single common electrode. The surfaces exposed to the liquid crystal are treated to confer alignment of the liquid crystal by methods known in the art. An electric field may be applied between the layers 118 and 120 by means of an external source and a switch.

Figure 2:
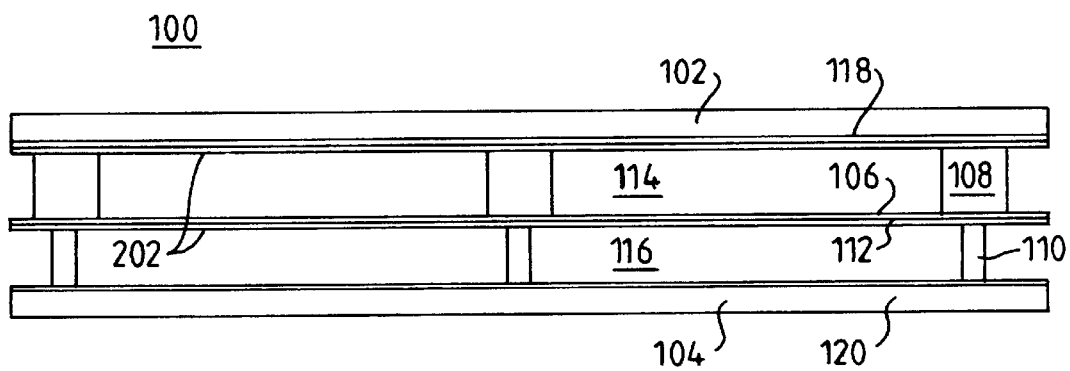
FIG. 2 shows a cross-section of a two compartment display cell according to the present invention.

A conventional two compartment cell, such as that of FIG. 1, is used to contain nematic guest-host liquid crystal mixtures. Referring to FIG. 2, a two compartment cell according to the present invention has a grating structure 202 added to one surface of each compartment. A grating structure 202 is added to either of the two surfaces of compartment 114, that is to a surface of substrate 102 or to the surface 106 of the thin dielectric membrane. A grating structure 202 is added to either of the two surfaces of compartment 116, that is to a surface of substrate 104 or to the surface 112 of the thin dielectric membrane. The example of FIG. 2 shows a grating structure on a surface of substrate 102 and a grating on a surface 112 of the thin dielectric membrane. As can readily be understood, this is only one of four possible combinations.

The grating is, in principle, similar to a diffraction grating, but the depth and pitch of the grating is such that little or no diffraction occurs to light passing through it. The mixtures are aligned by the combination of the grating structures 202 located on the surfaces of each of the cells 112, 114. The opposing surface of each of the cells is a plane surface, that is, it does not have a grating added.

Since the display is bistable, that is it has two stable states, it does not require an active matrix of driving elements associated with it. Each point on the matrix may be driven to the desired one of the two bistable states and will remain in that state until it is driven to the other of the two bistable states. The transparent electrode 118 on surface 102 is etched with column electrodes formed as columns. The transparent electrode 120 on surface 104 is etched with row electrodes formed as rows. The display is addressed by selecting each row in turn and applying the appropriate electrical voltage simultaneously to each of the column electrodes, thereby updating the state of the display a row at a time.

In an embodiment of the invention, the display cell is one having a non-twisted configuration. A liquid crystal material of positive dielectric anisotropy is used and the grating and the plane surface are treated so as to confer homeotropic, or perpendicular, alignment of the liquid crystal molecules.

In another embodiment of the invention, the display cell is one having a twisted configuration. A liquid crystal material of negative dielectric anisotropy is used, the grating is treated so as to confer homeotropic, or perpendicular, alignment and the plane surface is treated so as to confer homogeneous, or parallel, alignment of the liquid crystal molecules.

Such combinations of alignment, treatment and liquid crystal materials enable two stable configurations to exist in the liquid crystal layers 114, 116. These two stable states are a defect state and a continuous state and are described fully in J. C. Jones, E. L. Wood, G. P. Bryan-Brown, IL C. Hui, Proc SID Int Symp, XXIV, 858, (1998).

Figure 3:
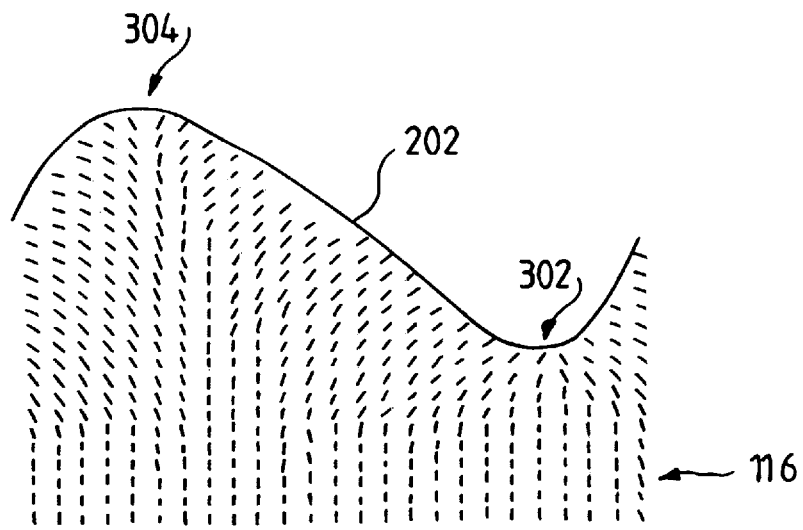
FIG. 3 shows a cross-section of a first stable state of a zenithal bistable display, a defect state, which may exist in a liquid crystal layer.

Briefly, FIG. 3 shows a defect state. The surface of grating 202 is at the top of FIG. 3. The liquid crystal tilt direction changes at the maximum 302 and the minimum 304 points of the grating 202. A tilt disinclination exists at those points which propagates through the entire liquid crystal layer. This is the "defect". The figure represents only the first 20–30 molecular layers in the liquid crystal layer, so the defect state shown in FIG. 3 is essentially homeotropic.

Figure 4:
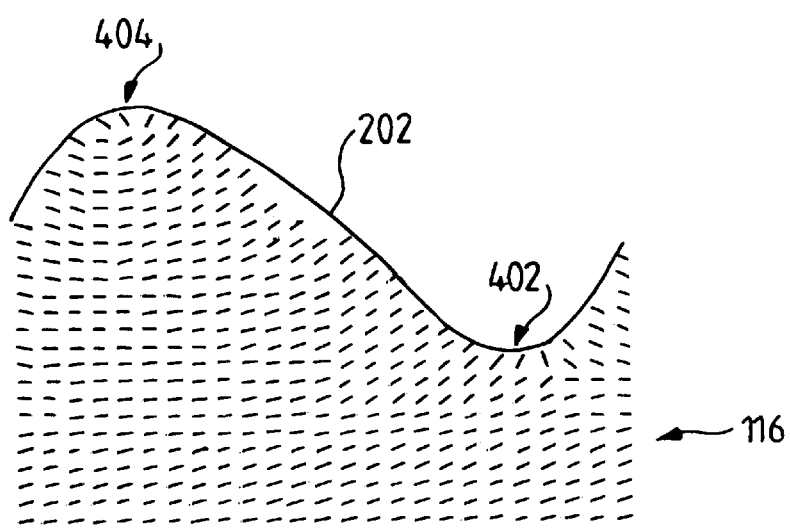
FIG. 4 shows a cross-section of a second stable state of a zenithal bistable display, a continuous state, which may exist in a liquid crystal layer.

FIG. 4 shows a continuous state. The surface of grating 202 is at the top of FIG. 3. The liquid crystal tilt direction does not change at the maximum 302 and the minimum 304 points of the grating 202. So, there are no defects and this is a "continuous" state. The figure represents only the first 20–30 molecular layers in the liquid crystal layer, so the continuous state shown in FIG. 4 is tilted homogeneous.

Figure 5:
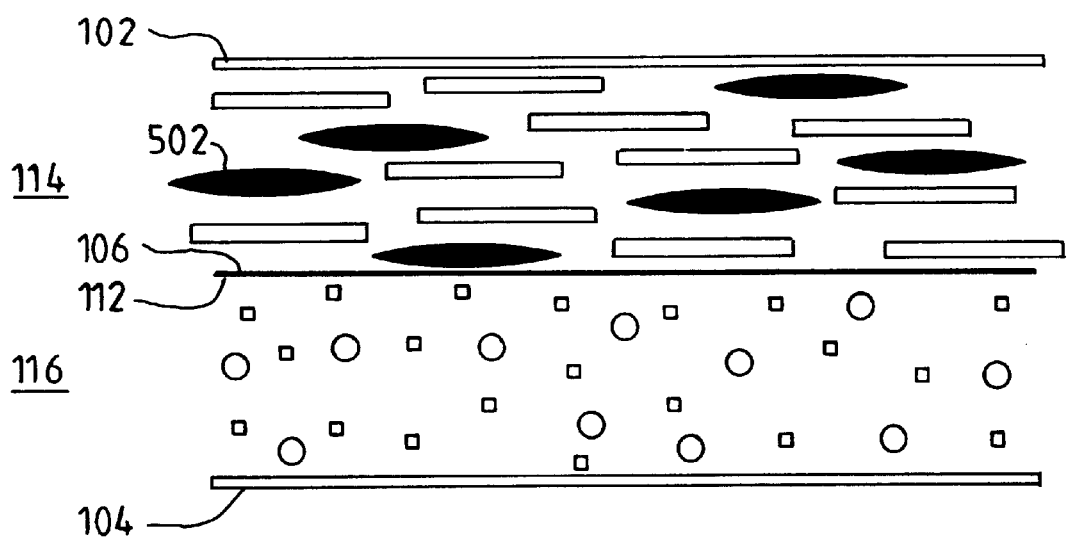
FIG. 5 shows a cross-section of a two compartment zenithal bistable display in a continuous state configuration.
Figure 6:
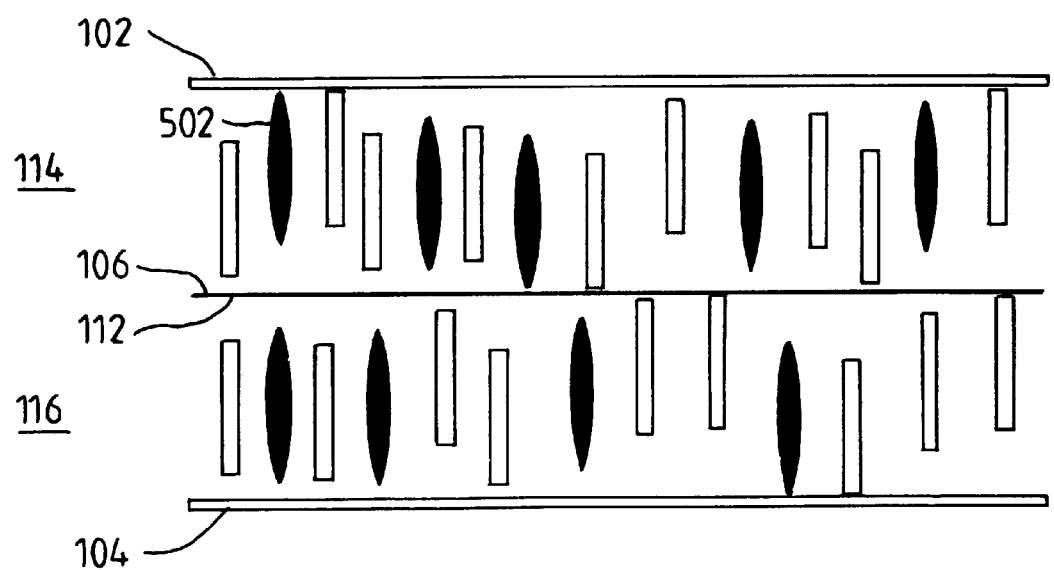
FIG. 6 shows a cross-section of a two compartment zenithal bistable display in a defect state configuration.

FIGS. 5 and 6 show a cross-section of a two compartment zenithal bistable display according to the present invention in which the black "lozenges" denote dye and the white rectangles denote liquid crystal. The display uses the first, non-twisted configuration in which the liquid crystal layers are oriented such that in one 114 of the compartments, the molecules 502 switch between a first state (shown in FIG. 5) in which they are aligned parallel to the plane of the display and parallel to a plane, parallel to the drawing sheet, taken through the cell and a second alignment (shown in FIG. 6) in which they are aligned normal to the plane of the display and parallel to a plane, parallel to the drawing sheet, taken through the cell. In the other 116 of the compartments, the molecules switch between a first alignment (shown in FIG. 5) in which they are aligned parallel to the plane of the display and normal to a plane, parallel to the drawing sheet, taken through the cell and a second alignment (shown in FIG. 6) in which they are aligned normal to the plane of the display and parallel to a plane, parallel to the drawing sheet, taken through the cell.

FIG. 5 shows the display in the first alignment, that is in the continuous state. The alignment in one compartment 114 is orthogonal to that in the other 116. The orthogonal alignment of dye molecules in the two compartments allows all polarisation states of incident light entering the cell through surface 102 to be absorbed. Note that the thin separating membrane 106, 112 between the compartments avoids parallax between images formed in the two compartments.

FIG. 6 shows the display in the second alignment, that is in the defect state. The alignment in one compartment 114 is identical to that in the other 116. The identical alignment of dye molecules in the two compartments allows a minimum of incident light to be absorbed. Thus the display can be switched between a white homeotropic state and a black homogeneous state by the application of a voltage of the appropriate polarity.

In a second embodiment, a twisted zenithal bistable configuration with a guest-host liquid crystal mixture of negative dielectric anisotropy is used.

Figure 7:
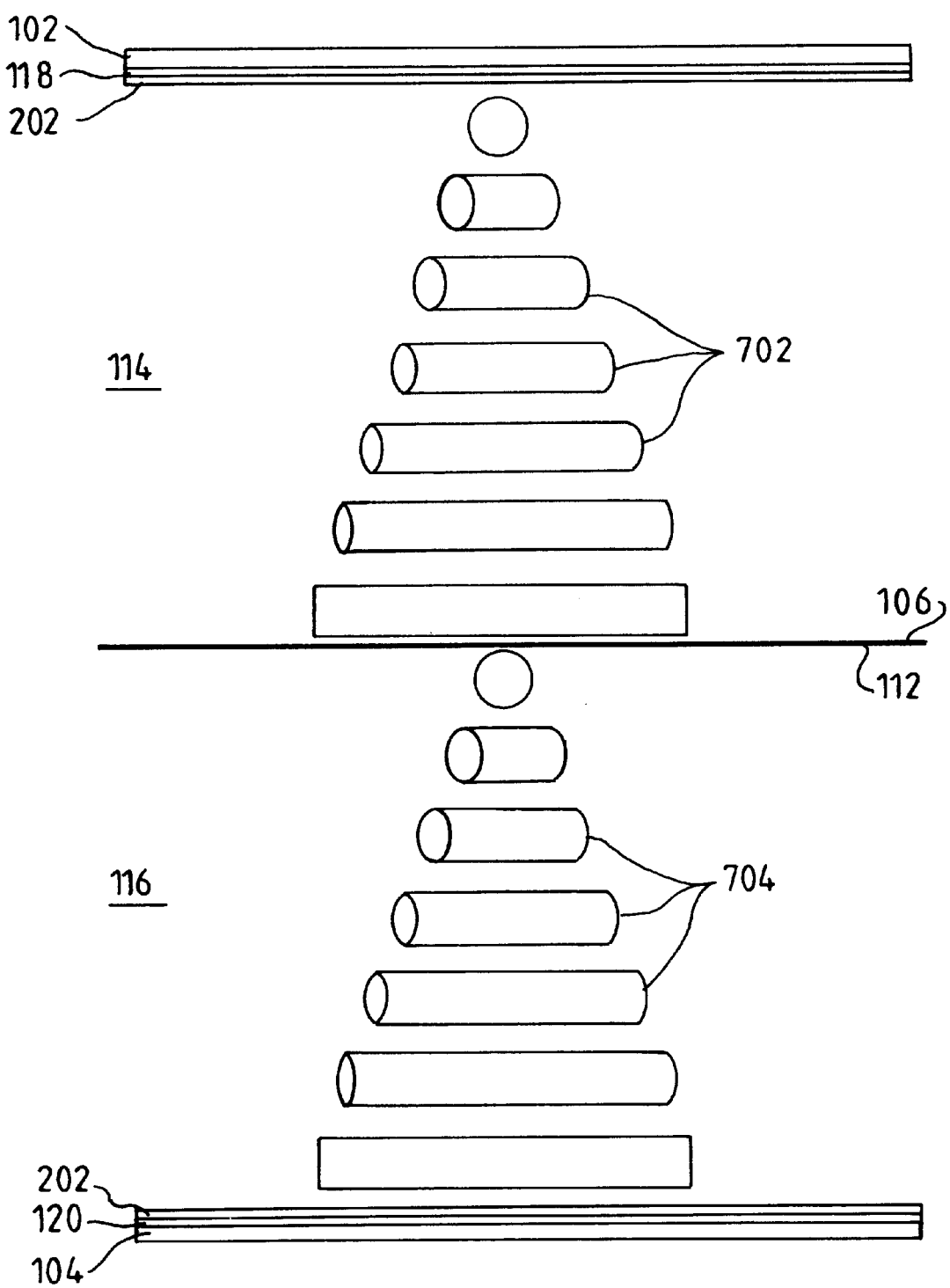
FIG. 7 shows a cross-section of a two compartment twisted zenithal bistable display in a continuous state configuration.

FIG. 7 shows the display in the first alignment, that is in the twisted continuous (dark) state. The alignment in one compartment 114 is identical to that in the other 116. The alignment of dye molecules in the two compartments allows all polarisation states of incident light entering the cell through surface 102 to be absorbed. Light polarised perpendicular to the drawing sheet is absorbed in the compartment 114 between substrate 102 and surface 106 of the thin dielectric membrane. The polarisation state which is not absorbed in compartment 114, which is initially oriented parallel to the plane of the page, is rotated through 90 degrees by the liquid crystal molecules 702 and enters compartment 116 oriented perpendicular to the plane of the page and is absorbed by the liquid crystal molecules 704 in the compartment 116 between surface 112 of the thin dielectric membrane and substrate 102. Note that the thin separating membrane 106, 112 between the compartments avoids parallax between images formed in the two compartments.

Figure 8:
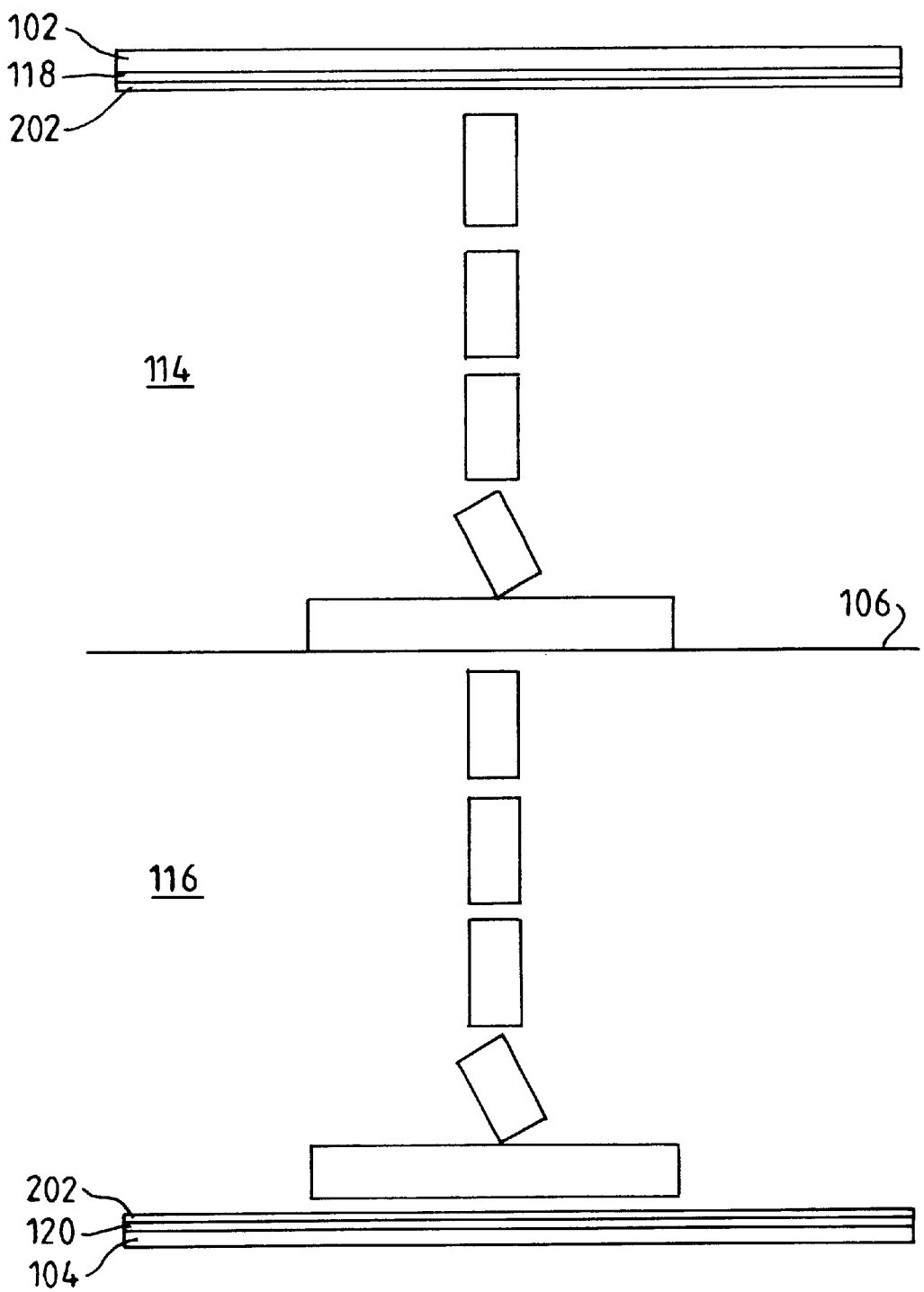
FIG. 8 shows a cross-section of a two compartment twisted zenithal bistable display in a defect state configuration.

FIG. 8 shows the display in the second alignment, that is in the defect (light) state. The alignment in one compartment 114 is identical to that in the other 116. The identical alignment of dye molecules in the two compartments allows a minimum of incident light to be absorbed. The liquid crystal material in both compartments 114, 116 is essentially homeotropic. Since the dye molecules can only absorb light polarised parallel to their long molecular axis, substantially no light is absorbed. Thus the display can be switched between a white homeotropic state and a black twisted homogeneous state by the application of a voltage of the appropriate polarity.

The concept of the bistable display is described in J. C. Jones, E. L. Wood, G. P. Bryan-Brown, IL C. Hui, Proc SID Int Symp, XXIV, 858, (1998), where it is called a zenithal bistable display (ZBD). In the described configuration, the average tilt of the continuous state with respect to the plane of the display is in the range of 20–40 degrees, which is satisfactory for a reflective display which operates in birefringence mode with a single layer and a front polariser.

In the present invention, with the appropriate combination of grating dimensions and liquid crystal elastic constants, the tilt angle can be reduced almost to zero, making the device suitable for application with guest-host mixtures.

The combination of a Zenithal Bistable Display layer with almost 90 degrees difference in tilt between the two states, used with guest-host mixtures in a two compartment cell provides the display of the present invention with the advantages of zero power consumption when the image is not being changed, a higher reflectivity than conventional displays and a lower cost display because it does not require an active matrix.

The present display will operate at 15V or less compared to 80V for a display such as that disclosed in U.S. Pat. No. 5,453,863 and has a reflectivity of greater than 60% compared to the 25–30% of that disclosed in U.S. Pat. No. 5,453,863. The display will operate at a lower voltage than prior art displays because the electric field has only to distort a thin layer adjacent to the grating surface to change the orientation of all the liquid crystal molecules in the layer. In prior art displays, a helical liquid crystal structure throughout the whole layer thickness has to be switched (or unwound).

What is claimed is:

1. A bistable liquid crystal display cell comprising two compartments separated by a thin transparent membrane, the first compartment containing a first liquid crystal mixture between a first substrate and a thin transparent membrane and the second compartment containing a second liquid crystal mixture between a second substrate and a thin transparent membrane, the mixtures having a first alignment in which they are both aligned parallel to the plane of the display cell, but orthogonal to each other, and a second alignment in which they are both aligned normal to the plane of the display cell, each compartment having a grating located on a surface of the compartment.

2. A bistable liquid crystal display cell as claimed in claim 1 wherein the grating associated with said first compartment is located on said first substrate.

3. A bistable liquid crystal display cell as claimed in claim 1 wherein the grating associated with said first compartment is located on a surface of said thin transparent membrane forming said first compartment.

4. A bistable liquid crystal display cell as claimed in claim 1 wherein the grating associated with said second compartment is located on a surface of said thin transparent membrane forming said second compartment.

5. A bistable liquid crystal display cell as claimed in claim 1 wherein the grating associated with said second compartment is located on said second substrate.

6. A bistable liquid crystal display cell as claimed in claim 1 in which the liquid crystal is a guest-host mixture.

7. A bistable liquid crystal display cell as claimed in claim 1 in which the liquid crystal has positive dielectric anisotropy.

8. A bistable liquid crystal display cell as claimed in claim 1 in which the liquid crystal has negative dielectric anisotropy.

9. A bistable liquid crystal display cell as claimed in claim 7 in which the alignment on the grating and the plane surfaces of the cell is homeotropic and the liquid crystal layer has an untwisted structure in the continuous state.

10. A bistable liquid crystal display cell as claimed in claim 7 in which the alignment on the grating surface of the cell is homeotropic, the alignment on the plane surface is homogeneous and the liquid crystal layer has a twisted structure in the continuous state.

11. A bistable liquid crystal display cell as claimed in claim 1 in which the reflective electrode is made from a reflective electrically conducting material.

12. A bistable liquid crystal display cell as claimed in claim 1 in which the reflective electrode is made from an electrically non-conducting material overlaid with a transparent, electrically conducting material.

13. A bistable liquid crystal display cell as claimed in claim 1 in which the display is addressed by an active matrix.

14. A bistable liquid crystal display cell as claimed in claim 1 in which the display is addressed by a passive matrix.

15. A bistable liquid crystal display cell as claimed in claim 1 in which the membrane separating the compartments of the cell is made from an organic polymeric dielectric material.

16. A bistable liquid crystal display cell as claimed in claim 1 in which the membrane separating the compartments of the cell is made from an inorganic dielectric material.

* * * * *